United States Patent
O'Donnell

Patent Number: 5,850,495
Date of Patent: Dec. 15, 1998

[54] METHOD OF ALIGNING BIREFRINGENT OPTICAL FIBERS

[75] Inventor: Adrian Charles O'Donnell, Chelmsford, England

[73] Assignee: Integrated Optical Components Limited, Essex, England

[21] Appl. No.: 816,303

[22] Filed: Mar. 13, 1997

[30] Foreign Application Priority Data

Mar. 14, 1996 [GB] United Kingdom .................. 9605384

[51] Int. Cl.[6] ........................................ G02B 6/26
[52] U.S. Cl. .............................. 385/52; 385/11; 385/49; 385/76; 385/77; 385/90; 385/91; 385/92
[58] Field of Search ................................ 385/11, 15, 31, 385/39, 49, 51, 52, 76, 77, 88, 90, 91, 92, 97, 139

[56] References Cited

U.S. PATENT DOCUMENTS

| | | | |
|---|---|---|---|
| 4,798,442 | 1/1989 | Feilhauer et al. ................ | 385/52 X |
| 4,893,931 | 1/1990 | Lefevre et al. .................. | 356/351 |
| 5,046,808 | 9/1991 | Chang ............................. | 385/13 |
| 5,351,124 | 9/1994 | Laskoskie et al. ............... | 356/351 |
| 5,381,494 | 1/1995 | O'Donnell et al. ............... | 385/49 |
| 5,606,415 | 2/1997 | Doty ............................... | 356/350 |
| 5,625,735 | 4/1997 | Di Maggio et al. ............. | 385/91 |
| 5,671,316 | 9/1997 | Yuhara et al. ................... | 385/137 |

*Primary Examiner*—Brian Healy
*Attorney, Agent, or Firm*—McGlew and Tuttle

[57] ABSTRACT

A method of aligning a bi-refringent optical fiber with a polarisation sensitive component positioned within a package so that the bi-refrigence axes of the fiber are set in a pre-defined relation to a light guide within the component. The fiber is inserted through an aperture in the package and is approximately aligned with the light guide of the component. An optical probe having a tip provided with an optical polariser is positioned with the tip between the end of the fiber and the component, to collect light from the fiber. The free end of the fiber is manipulated and the output from the probe is monitored until the desired polarisation alignment is achieved whereafter the probe is removed from the package whilst the rotational relationship between the fiber and the component is maintained. Then, the fiber end is moved to optically couple wish the component and the fiber is secured in position. The package may thereafter be completed in the usual way.

14 Claims, 2 Drawing Sheets

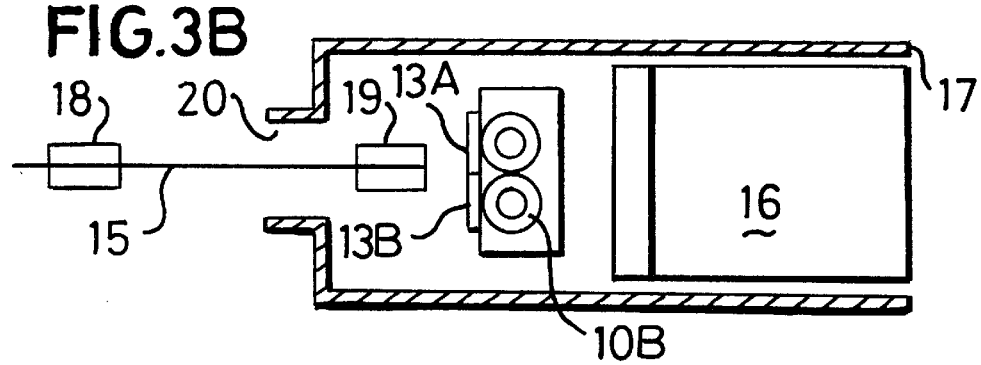
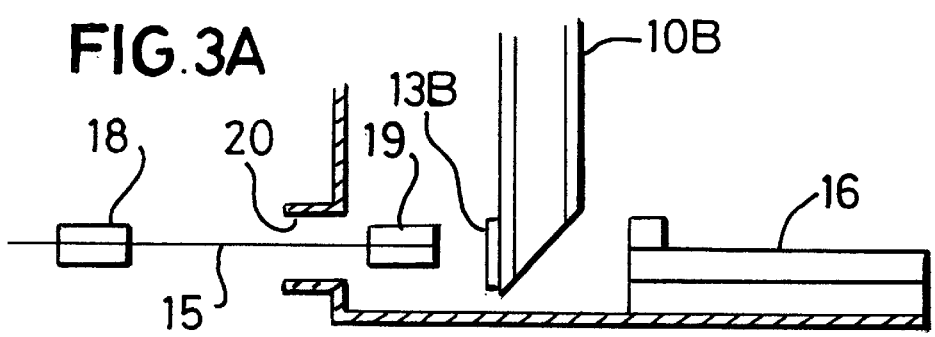
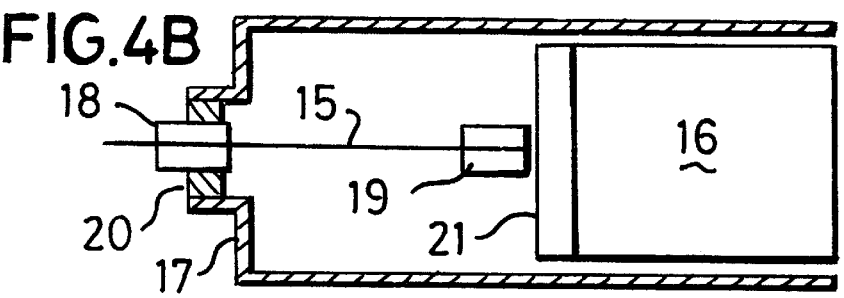
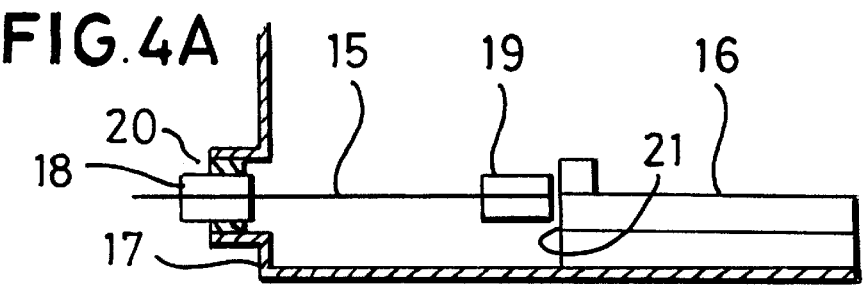

METHOD OF ALIGNING BIREFRINGENT OPTICAL FIBERS

BACKGROUND TO THE INVENTION

1. Field of the Invention

This invention relates to a method of aligning the bi-refringence axes of an optical fiber with a polarisation-sensitive component. The invention further relates to a probe for use in performing such a method.

2. Description of the Prior Art

Many integrated optical components used for example in the telecommunications industry have a sensitivity to the polarisation state of light supplied to the component, or output processed light having a particular polarisation state. Optical fibers connected to such components may include so-called stress rods extending axially along the sheath of the fiber, parallel to the fiber itself in order to impart bi-refringence properties to the fiber. Such stress rods effectively change the refractive index of the fiber in two axes at 90° to each other and so polarised light fed into the fiber aligned with the bi-refringence axes will be transmitted along the fiber with the polarisation state maintained essentially constant. Instead of employing stress rods embedded in the fiber sheath, a similar effect may be obtained by suitable sheath design so as to have elongate stress regions formed therein.

When an optical fiber as described above is to be connected to a component having polarisation sensitivity, the bi-refringence axes of the fiber must suitably be aligned with the component in order that polarised light may enter the component from a fiber with a minimal insertion loss, or so that light processed in the component may leave the component and enter a fiber for onward transmission, again with a minimal loss. To achieve such alignment, the usual procedure is to examine the end of the fiber, for example with a microscope, to determine the position of the bi-refringence axes, and the fiber is then turned so that the axes are set for proper alignment with the light guide of the component with which the fiber is to connect. The fiber end is then passed through an aperture in the component packaging and is engaged with the component to couple with the light guide therein. Unfortunately, the manipulation of the fiber end portion to achieve this frequently gives rise to accidental rotation of the fiber, resulting in a misalignment of the fiber with the component. In turn, this leads to reduced optical efficiency.

It is a principal object of the present invention to provide a method of aligning the bi-refringence axes of an optical fiber with a polarisation sensitive component in such a way that the incidence of misalignment is much reduced, to give a significantly improved performance when averaged over a number of components.

SUMMARY OF THE INVENTION

According to one aspect of the present invention, there is provided a method of aligning a bi-refringent optical fiber so that the bi-refringence axes thereof are set in a pre-defined relation to a polarisation-sensitive component positioned within an open-topped package having an entry aperture for the fiber. The method comprises the steps of:

inserting the end portion of the fiber through the aperture in the package and establishing an approximate mechanical alignment for the fiber with the component but with the fiber end still spaced from the component;

inserting through the open top of the package an optical probe having at its free end a tip provided with an optical polariser such the tip is positioned between the end of the fiber and the component and light from the fiber falls on the polariser, the probe being arranged to feed received light to a detector;

manipulating the free end of the fiber whilst directing light therealong to fall on the probe tip and monitoring the output from the probe until the desired polarisation alignment is achieved;

removing the probe from the package;

moving the fiber so that the end optically couples with the component whilst maintaining the rotational relationship between the fiber and the component; and securing the fiber in the required position.

From the above, it will be appreciated that on performing the method of this invention, the end portion of a fiber is inserted through an aperture in the component package and the fiber end face is positioned closely adjacent the light guide formed in the component, before any attempt is made to align the bi-refringent axes of the fiber with the component. Then, a polarisation sensitive probe is located between the end face of the fiber and the component. Light is launched into the distal end of the fiber and the polarisation state of light issuing from the fiber and incident on the probe is monitored whilst the fiber is rotated until the required rotational alignment is achieved. The probe is then removed and the end of the fiber is moved the relatively short distance to the component whereat the fiber is coupled to the light guide in the usual way. As only a very small linear movement has to be imparted to the fiber following the setting of the bi-refringence axes relative to the component, the likelihood of the fiber moving out of rotational alignment is very small.

BRIEF DESCRIPTION OF THE DRAWINGS

In order that the invention may better be understood, it will now be described in more detail and then one specific example of an alignment method of this invention and the particulars of two embodiments of probes will be explained, reference being made to the accompanying drawings, in which:

FIGS. 3A and 3B are respectively side and plan views of the probe of FIGS. 2A and 2B used in an alignment method of this invention; and FIGS. 4A and 4B are respectively side and plan views of a fiber coupled to an optical component following completion of the method of this invention.

DESCRIPTION OF THE PREFERRED EMBODIMENTS

When performing the method of this invention, it is preferred for the polarisation axis of the polariser to be selected having regard to the desired polarisation alignment between the fiber and the component, and the magnitude of the output from the probe is monitored during the alignment step, to determine one of a maximum or minimum value. Conveniently, this is achieved by directing the light on to a photo-detector and electronically monitoring for a maximum or minimum detector output, as appropriate.

This invention extends to a probe for use in a method of this invention as described above, and comprising a light guide contained within a substantially rigid cladding, the tip of the probe having a polariser mounted thereon and arranged to direct light falling on the polariser into the light guide.

A preferred form of probe has a pair of polarisers mounted at the tip thereof in a side by side disposition, each polariser directing light to a respective detector and the respective planes of polarisation of the two polarisers being different— and conveniently set at 90° to each other. Such a probe should be positioned such that light issuing from a fiber being aligned diverges to fall on both polarisers and the outputs from the respective detectors are simultaneously monitored during the alignment step.

The or each light guide in the probe conveniently comprises an optical fiber, though of a relatively large diameter. In this case, the polariser associated with the or each fiber should be positioned adjacent the free end thereof in a plane parallel to the fiber axis. The free end of the fiber should then be cut at substantially 45° to the fiber axis. In this way, light passing through the polariser will be incident on the cut face of the fiber end and internally reflected through 90° so as to be propagated along the fiber.

Figure 1A:
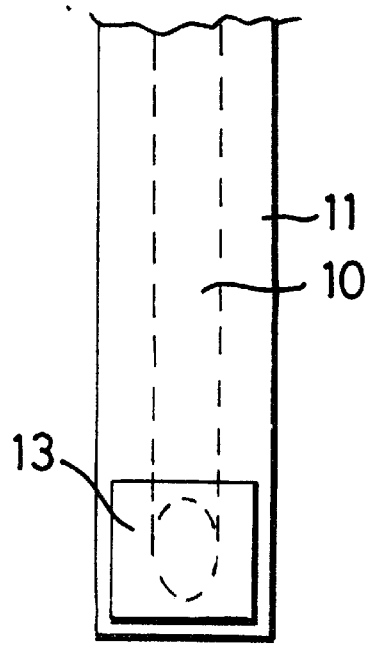
FIG. 1A is an end view of a first embodiment of probe for use in a method of this invention.
Figure 1B:
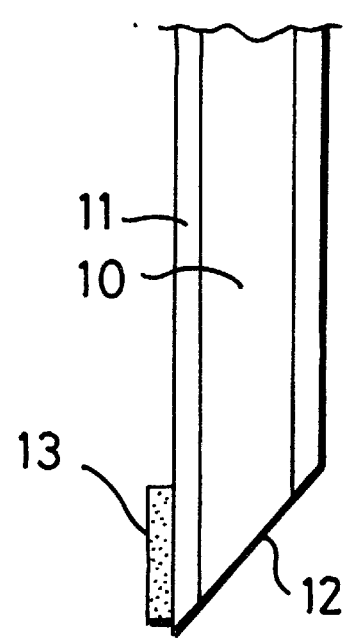
FIG. 1B is a side view of the probe of FIG. 1A.

Turning now to the drawings, the probe illustrated in FIGS. 1A and 1B comprises a light guide 10 contained within a substantially rigid but transparent cladding 11, which guide may take the form of a relatively large diameter optical fiber. The end face 12 of the guide 10 is cut at substantially 45° to the axis of the guide and an optical polariser 13 is cemented to the lower end of the cladding 11 such that light incident on and passing through the polariser 13 will fall on the cut end face 12. Such light will be internally reflected from that end face and will be propagated along the guide 10.

At the upper end (not shown) of the probe, there is provided a photo-detector arranged such that light passing along the guide 10 will fall on the detector which will produce an electrical output dependent upon the amplitude of the light. That output is electronically monitored to give a visual indication of the light amplitude.

Figure 2A:
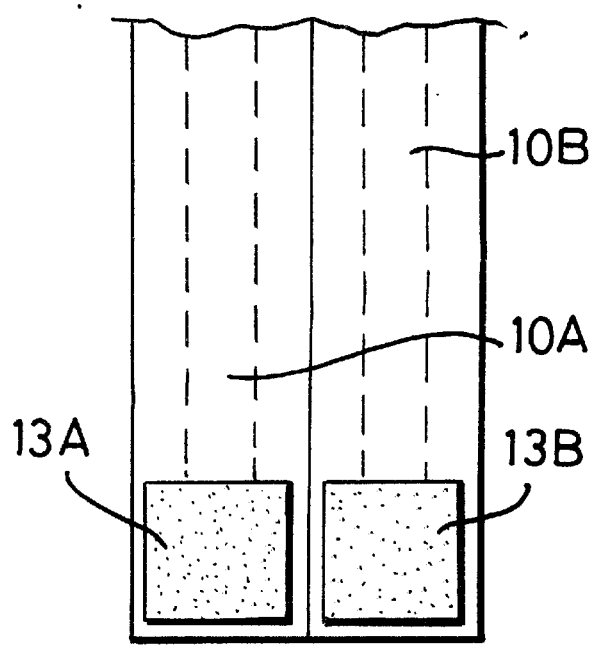
FIGS. 2A and 2B are views similar to those of FIGS. 1A and 1B but of a second embodiment of probe.
Figure 2B:
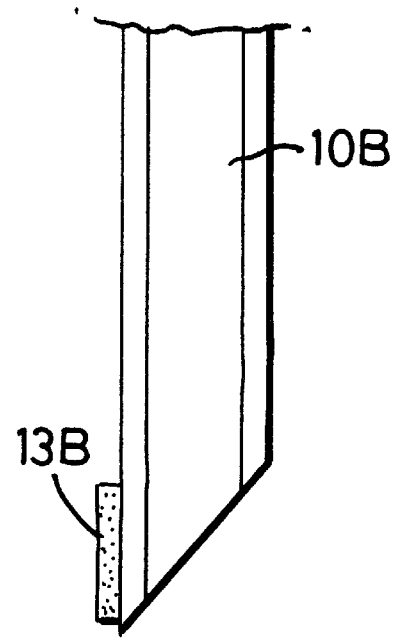

FIGS. 2A and 2B show a second embodiment of probe in effect comprising two probes each similar to that of FIGS. 1A and 1B, arranged side-by-side. Each light guide 10A and 10B is provided with its own photo-detector (not shown) such that in use the probe may provide two outputs respectively indicative of the amplitude of light passing through the polarisers.

FIGS. 3A and 3B show the use of the probe of FIGS. 2A and 2B in order to align the bi-refringence axes of an optical fiber 15 with a light guide (not shown) formed in an integrated optical component 16 positioned within a package 17. The fiber is passed through a mounting sub-assembly 18 suitable for connection to the package 17. The end portion of the fiber 15 is located within a ferrule 19 and prepared for coupling to the component in a conventional manner. The ferrule 19 is passed through an aperture 20 in the package and is positioned closely adjacent the end face 21 of the component. The probe 21 of FIGS. 2A and 2B is lowered to lie between that ferrule 19 and the component with the polarisers 13A and 13B facing the fiber.

Light is launched along the fiber 15 from the distal end (not shown) and is polarised by the bi-refringence properties of that fiber. The light issuing from the end of the fiber diverges to fall on both polarisers 13A and 13B; the fiber is then rotated whilst the outputs from the two detectors of the probe are monitored until the bi-refringence axes of the fiber has the required alignment with the component. The polarisation planes of the two polarisers should be selected having regard to the component with which the probe is used in order that the correct alignment is achieved when one detector has a maximum output and the other a minimum.

Following achievement of the required fiber alignment, the probe is withdrawn and the fiber is moved linearly until ferrule 19 engages the end face 21 of the component 16, as shown in FIGS. 4A and 4B. During this linear movement, the rotational alignment is maintained. Then, the connection of the ferrule 19 to the component and also the securing of the sub-assembly 18 within the aperture 20 in the package 17 are completed in a conventional manner well known to those skilled in the art. Finally, the package is closed hermetically to seal the component within the package, for example using a potting compound or the like.

I claim:

1. A method of aligning a bi-refringent optical fiber so that the bi-refringence axes thereof are set in a pre-defined relation to a polarisation-sensitive component positioned within an open-topped package having an entry aperture for the fiber, comprising the steps of:

inserting the end portion of the fiber through the aperture in the package and establishing an approximate mechanical alignment for the fiber with the component but with the fiber end still spaced from the component;

inserting through the open top of the package an optical probe having at its free end a tip provided with an optical polariser such the tip is positioned between the end of the fiber and the component and light from the fiber falls on the polariser, the probe being arranged to feed received light to a detector;

manipulating the free end of the fiber whilst directing light therealong to fall on the probe tip and monitoring the output from the probe until the desired polarisation alignment is achieved;

removing the probe from the package;

moving the fiber so that the end optically couples with the component whilst maintaining the rotational relationship between the fiber and the component; and securing the fiber in the required position.

2. A method as claimed in claim 1, wherein the polarisation axis of the polariser is selected having regard to the desired polarisation alignment between the fiber and the component, and the magnitude of the output from the probe is monitored during the alignment step.

3. A method as claimed in claim 1, wherein the probe has an optical fiber arranged to receive light passing through the polariser, which optical fiber directs received light on to a photo-detector.

4. A method as claimed in any of the preceding claims, wherein the optical fiber extends along the length of the probe and the end of the optical fiber at the tip of the probe is cut at substantially 45° to the optical fiber axis, light passing through the polariser falling on the cut end of the fiber.

5. A method as claimed in claim 4, wherein the probe comprises an optical fiber supported by a substantially rigid cladding, the polariser being mounted on the cladding at the tip of the probe.

6. A method as claimed in claim 1, wherein the probe has a pair of polarisers mounted at the tip thereof in a side-by-side disposition, each polariser directing light to a respective detector and the planes of polarisation of the two polarisers being different.

7. A method as claimed in claim 6, wherein the two polarisers are set with their respective planes of polarisation set at 90° to each other.

8. A method as claimed in claim 6, wherein the probe tip is positioned between the end of the fiber being aligned and the component such that light issuing from the fiber falls on both polarisers and the output from the respective detectors is simultaneously monitored during the alignment step.

9. A method as claimed in claim 1, wherein following the securing of the fiber in the required disposition with respect to the component, the package is closed to seal from the ambient the fiber and the component.

10. A method as claimed in claim 9, wherein the closing is performed by potting the component within the package with a setting potting agent.

11. A probe for use in a method as claimed in claim 1 and comprising a light guide contained within a substantially rigid cladding, the tip of the probe having a polariser mounted thereon and arranged to direct light falling on the polariser in to the light guide.

12. A probe as claimed in claim 11, wherein the light guide comprises an optical fiber, and the polariser is mounted on the cladding therefor.

13. A probe as claimed in claim 11, wherein the polariser is positioned adjacent the free end of the optical fiber in a plane parallel to the axis thereof, and the free end of the optical fiber is cut at substantially 45° to the fiber axis such that light passing through the polariser is incident on the cut face of the fiber end.

14. A probe as claimed in claim 12, wherein the probe has a pair of polarisers mounted at the tip thereof in a side-by-side disposition, and a pair of light guides within the cladding, each polariser directing light to a respective light guide, and the plane of polarisation of the two polarisers being arranged differently.

* * * * *